US012031450B2

(12) United States Patent
Sun et al.

(10) Patent No.: US 12,031,450 B2
(45) Date of Patent: Jul. 9, 2024

(54) TURBOCHARGER WITH VANED DIFFUSER FOR THE COMPRESSOR

(71) Applicant: Garrett Transportation I Inc., Torrance, CA (US)

(72) Inventors: Haiying Sun, Shanghai (CN); Xiongxiong Tang, Wuhan (CN); Guangqing Zheng, Shanghai (CN)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 17/819,641

(22) Filed: Aug. 15, 2022

(65) Prior Publication Data

US 2024/0044263 A1 Feb. 8, 2024

(51) Int. Cl.

*F01D 25/24* (2006.01)
*F01D 9/04* (2006.01)
*F01D 11/00* (2006.01)

(52) U.S. Cl.

CPC ........... *F01D 25/246* (2013.01); *F01D 9/041* (2013.01); *F01D 11/003* (2013.01); *F05D 2220/40* (2013.01); *F05D 2230/64* (2013.01); *F05D 2240/14* (2013.01); *F05D 2250/12* (2013.01); *F05D 2260/36* (2013.01)

(58) Field of Classification Search

CPC ...... F01D 9/041; F01D 25/246; F01D 11/003; F04D 29/444; F04D 17/08; F04D 17/10; F04D 1/04; F05D 2220/40; F05D 2230/64; F05D 2240/14; F05D 2250/12; F05D 2260/36

See application file for complete search history.

(56) References Cited

U.S. PATENT DOCUMENTS 3,180,568 A * 4/1965 Oettle ........................ F02C 6/12 277/423
4,378,194 A * 3/1983 Bandukwalla ........ F01D 17/143 415/49
4,626,168 A * 12/1986 Osborne ............... F04D 29/444 415/208.3

(Continued)

FOREIGN PATENT DOCUMENTS

CN 1871438 A * 11/2006 ........... F04D 29/444
EP 1734231 A1 * 12/2006 ........... F01D 17/165

(Continued)

*Primary Examiner* — David E Sosnowski
*Assistant Examiner* — Wayne A Lambert
(74) *Attorney, Agent, or Firm* — BelayIP

(57) ABSTRACT

A turbocharger having a centrifugal compressor includes a vaned diffuser. The vaned diffuser is formed by a diffuser ring formed separately from the compressor housing and center housing. The diffuser ring is installed between the compressor and center housings such that a diffuser passage is defined between a surface of the compressor housing and a surface of the diffuser ring. Integral vanes on the diffuser ring extend only partially across the axial width of the diffuser passage. A rectangular-section seal ring is axially compressed between the compressor housing and the diffuser ring for sealing and axial locating of the diffuser ring. Radial locating of the diffuser ring is accomplished by an integral locating pin on the ring, which fits into a receptacle in the center housing.

3 Claims, 4 Drawing Sheets

(56) References Cited

U.S. PATENT DOCUMENTS

| | | | | | |
|---|---|---|---|---|---|
| 4,902,200 | A * | 2/1990 | Bandukwalla | F04D 29/464 | 415/157 |
| 5,059,091 | A * | 10/1991 | Hatfield | F04D 29/462 | 415/126 |
| 5,178,516 | A * | 1/1993 | Nakagawa | F04D 29/444 | 415/211.2 |
| 5,214,920 | A * | 6/1993 | Leavesley | F01D 17/143 | 415/157 |
| 6,845,617 | B1 * | 1/2005 | Allen | F02B 37/10 | 123/565 |
| 7,367,190 | B2 * | 5/2008 | Shibui | F01D 25/125 | 415/95 |
| 9,874,140 | B2 * | 1/2018 | Yonezawa | F02B 39/00 | |
| 2011/0038742 | A1 * | 2/2011 | Fleig | F01D 25/246 | 417/406 |
| 2011/0162359 | A1 * | 7/2011 | Bochud | F16J 15/441 | 277/411 |
| 2012/0111002 | A1 * | 5/2012 | Tabata | F02D 21/08 | 60/611 |
| 2012/0294711 | A1 * | 11/2012 | Grigoriev | F04D 29/444 | 415/204 |
| 2016/0265549 | A1 * | 9/2016 | Annati | F04D 29/441 | |
| 2017/0350408 | A1 * | 12/2017 | Sakurai | F04D 29/023 | |
| 2018/0216629 | A1 * | 8/2018 | Benetschik | F04D 29/444 | |
| 2019/0226393 | A1 * | 7/2019 | Arakawa | F02B 39/08 | |

FOREIGN PATENT DOCUMENTS

| | | | | |
|---|---|---|---|---|
| EP | 1895107 | A1 * | 3/2008 | F01D 11/003 |
| EP | 3650709 | A1 * | 5/2020 | |
| JP | H0176524 | U * | 5/1989 | |

* cited by examiner

TURBOCHARGER WITH VANED DIFFUSER FOR THE COMPRESSOR

BACKGROUND OF THE INVENTION

This application relates generally to turbochargers for internal combustion engines, and relates more specifically to compressor arrangements for turbochargers. In particular, this application relates to compressor arrangements that include a vaned diffuser.

An exhaust gas-driven turbocharger is a device used in conjunction with an internal combustion engine for increasing the power output of the engine by compressing the air that is delivered to the engine's air intake to be mixed with fuel and burned in the engine. A turbocharger comprises a centrifugal compressor wheel mounted on one end of a shaft in a compressor housing and a turbine wheel mounted on the other end of the shaft in a turbine housing. Typically there is a center housing connected between the turbine and compressor housings for containing bearings for the shaft. The turbine housing defines a generally annular chamber that surrounds the turbine wheel and receives exhaust gas from the engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and passed through a diffuser into a volute that collects the compressed air. The compressed air is then discharged from the housing to the engine air intake.

Diffuser performance is an important aspect of overall compressor performance, and more specifically, compressor stability. It is known that the use of vanes in a compressor diffuser can benefit compressor surge margin by delaying the onset of surge to lower flow rates at a given pressure ratio. Inclusion of vanes, however, can add significantly to the cost of the turbocharger.

SUMMARY OF THE DISCLOSURE

The present disclosure describes embodiments of a turbocharger having a vaned diffuser for the compressor. By virtue of the vaned diffuser configuration of the invention, the inclusion of vanes in the diffuser can substantially reduce the additional cost of vanes, relative to other conventional vane configurations.

In accordance with one embodiment of the invention, a diffuser ring is mounted between the compressor housing and the center housing of the turbocharger such that a diffuser passage is defined between a surface of the compressor housing and a surface of the diffuser ring. The diffuser ring defines vanes integrally formed with and axially projecting from said surface of the diffuser ring, an axial height of the vanes being smaller than an axial width of the diffuser passage. The vane height can be approximately one-third to one-half of the axial width of the diffuser.

A seal ring is axially compressed between the compressor housing and the diffuser ring to provide sealing for the air passing through the diffuser. The seal ring can have a rectangular cross-sectional shape (e.g., square). The seal ring also ensures that the diffuser ring abuts the center housing and thereby axially locates the diffuser ring.

The diffuser ring can define an integrally formed locating pin that axially projects toward the center housing, and the center housing can define a blind receptacle into which the locating pin is received for radially locating the diffuser ring relative to the center housing.

In one embodiment, the center housing defines an integrally formed, axially projecting fence located radially outwardly of and proximate to a radially outer periphery of the seal ring. The axial height of the fence is no less than the axial thickness of the seal ring in its uncompressed free state. The fence facilitates assembly of the diffuser ring and seal ring with the center housing.

BRIEF DESCRIPTION OF THE DRAWINGS

Having described the present disclosure in general terms, reference will now be made to the accompanying drawing (s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention (s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
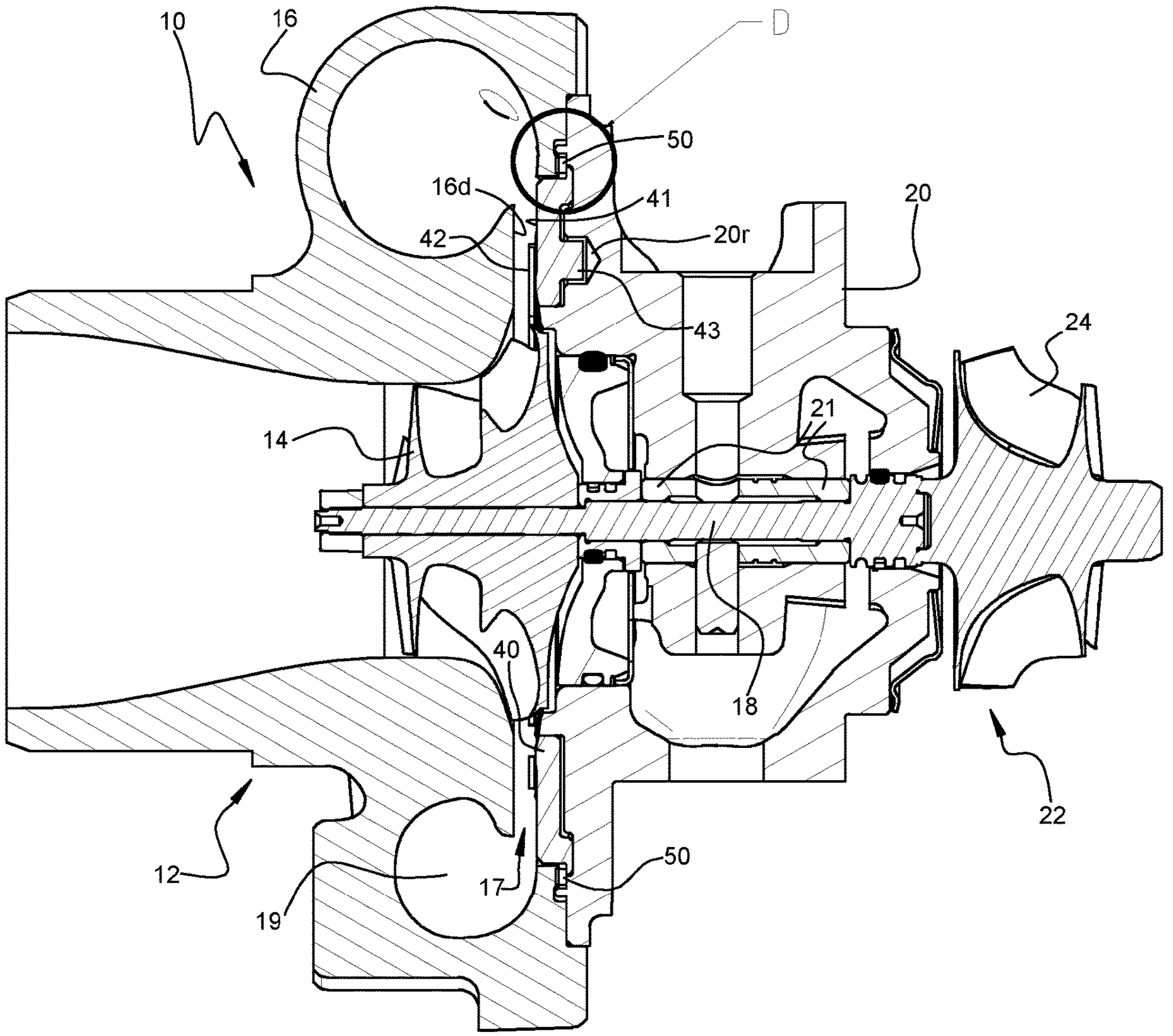
FIG. 1 is an axial cross-sectional view of a turbocharger (minus the turbine housing) in accordance with one embodiment of the invention.
Figure 2:
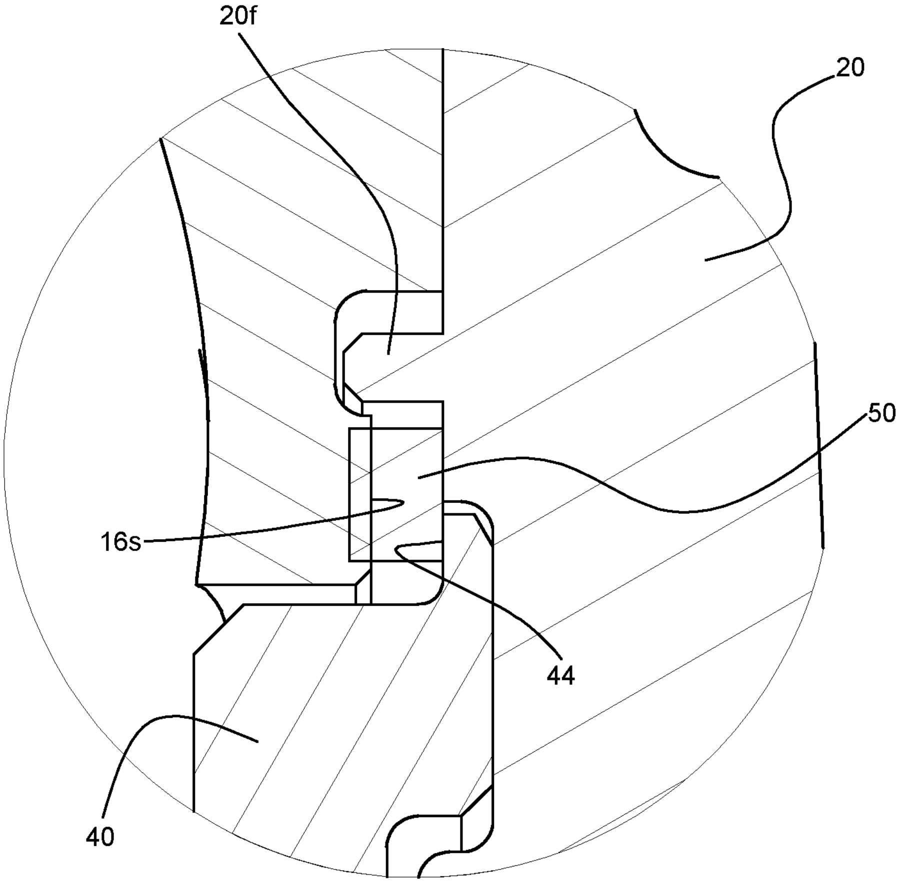
FIG. 2 is a magnified view of a portion of FIG. 1.
Figure 3:
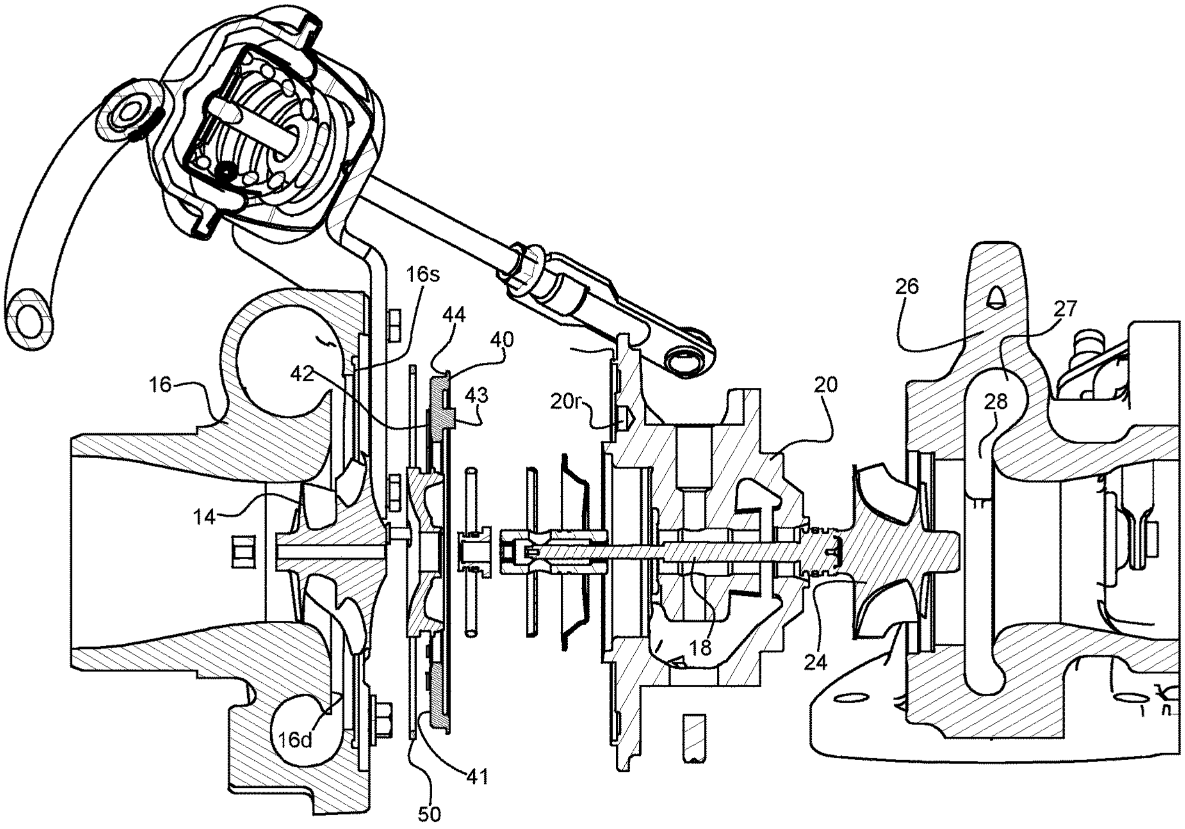
FIG. 3 is an exploded cross-sectional view of the turbocharger of FIG. 1.
Figure 4:
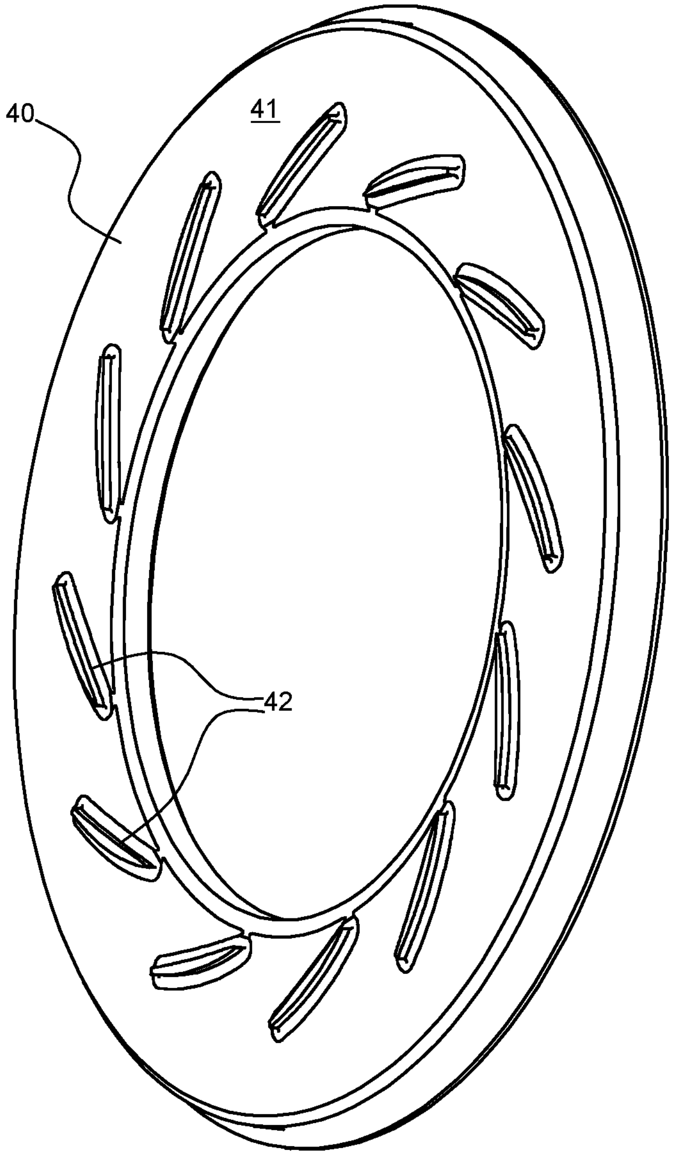
FIG. 4 is an isometric view of a vaned diffuser ring in accordance with one embodiment of the invention.

FIGS. 1-4 illustrate a turbocharger 10 that incorporates a compressor arrangement in accordance with one embodiment of the invention. The turbocharger includes a compressor 12 comprising a centrifugal compressor wheel 14 mounted within a compressor housing assembly 16. The compressor wheel is affixed to one end of a rotatable shaft 18. A center housing 20 is fastened to the downstream side of the compressor housing assembly. Bearings 21 for the shaft 18 are housed within the center housing. The turbocharger further comprises a turbine 22 having a turbine wheel 24 mounted within a turbine housing 26 (FIG. 3) that is fastened to the opposite side of the center housing from the compressor. The turbine wheel is affixed to the opposite end of the shaft 18. The turbine housing defines an annular chamber 27 for receiving exhaust gases from an internal combustion engine via an inlet into the chamber. A turbine nozzle 28 directs exhaust gases from the chamber radially inwardly onto the turbine wheel 24, which is thereby rotatably driven as the wheel expands the exhaust gases passing through it, and the turbine wheel rotates the compressor wheel 14. Air axially entering the compressor wheel via the compressor inlet is pressurized by the wheel and is discharged radially outwardly from the exducer of the wheel, passing through a diffuser 17 into a volute 19 defined in the compressor housing assembly 16. Pressurized air from the volute is supplied to an intake manifold of the internal combustion engine.

In accordance with the invention, the compressor housing assembly includes a vaned diffuser ring 40 formed as a separate part from the main compressor housing. The diffuser ring is installed between the main compressor housing and the center housing, without requiring any fasteners (e.g., bolts, pins, etc.) for affixing the diffuser ring in place. The diffuser passage for compressed air is defined between a surface 16*d* of the main compressor housing and a surface 41 of the diffuser ring. The diffuser ring defines integrally formed vanes 42 that project axially from the surface 41. The axial height of the vanes is less than the axial distance between the surfaces 16*d* and 41. In one embodiment, the axial height of the vanes can be approximately one-third to one-half of said axial distance.

The diffuser ring 40 is located axially and radially within the turbocharger assembly by cooperative features that are integrally formed on the diffuser ring and center housing, respectfully, together with a seal ring that also provides a sealing function. Thus, the diffuser ring defines an integral locating pin 43 that projects axially toward the center housing. The center housing correspondingly defines a blind bore or recess 20*r* for receiving the locating pin 43, and in this fashion the diffuser ring is radially positioned in the correct location within the assembly. A seal ring 50 is included for engaging an axially facing sealing surface 16*s* of the compressor housing and an axially facing sealing surface 44 of the diffuser ring. The seal ring preferably has a rectangular (e.g., square) cross-sectional shape. When the center housing and compressor housing are fastened together, the seal ring is axially compressed between these surfaces, which ensures that the diffuser ring axially abuts the center housing, thereby axially locating the diffuser ring. An integrally formed fence 20*f* on the center housing is located adjacent a radially outer periphery of the seal ring to facilitate assembly of the diffuser ring arrangement.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger comprising:

a compressor housing and a centrifugal compressor wheel mounted within the compressor housing and affixed to one end of a shaft, the compressor housing defining a volute for receiving compressed air from the compressor wheel;

a turbine housing and a turbine wheel mounted within the turbine housing and affixed to an opposite end of the shaft;

a center housing containing bearings for the shaft, one side of the center housing abutting the compressor housing and an opposite side of the center housing abutting the turbine housing;

a diffuser ring mounted between the compressor housing and the center housing such that a diffuser passage is defined between a surface of the compressor housing and a surface of the diffuser ring, the diffuser ring defining vanes integrally formed with and axially projecting from said surface of the diffuser ring, an axial height of the vanes being smaller than an axial width of the diffuser passage a seal ring axially compressed between the compressor housing and the diffuser ring, and wherein the diffuser ring defines an integrally formed locating pin that axially projects toward the center housing, and the center housing defines a blind receptacle into which the locating pin is received for radially locating the diffuser ring relative to the center housing, and wherein the center housing defines an integrally formed, axially projecting fence located radially outwardly of and proximate to a radially outer periphery of the seal ring.

2. The turbocharger according to claim 1, wherein the axial height of the vanes is between one-third and one-half of the axial width of the diffuser passage.

3. The turbocharger according to claim 1, wherein the seal ring has a rectangular cross-sectional shape.

* * * * *